Patented Apr. 9, 1929.

1,708,287

UNITED STATES PATENT OFFICE.

JOHN W. TURRENTINE, OF WASHINGTON, DISTRICT OF COLUMBIA.

METHOD OF RECOVERING IODINE.

No Drawing.   Application filed February 18, 1925.   Serial No. 10,149.

This invention relates to iodine and methods of separating the same from its impurities and particularly to the recovery of iodine from materials in which it occurs in relatively low concentrations and preparing it in the elemental and purified state.

Heretofore in the manufacture of iodine more or less elaborate procedures have been required or preliminary operation to obtain the iodine compounds in a more concentrated form. Solutions containing it, for example have been evaporated to effect concentration to the degree where on the liberation of the iodine in the vapor state (by any one of the well known methods employed for many years in that ancient art) that vapor would be in a sufficiently concentrated condition to admit of its direct condensation to the solid state.

Furthermore, in cases where iodine occurs in relatively low concentrations particularly in solutions containing high concentrations of other substances which are to be recovered also it is difficult to develop high concentrations of iodine by evaporation and crystallization methods without incurring serious losses of that constituent in the mother liquors carried by the various crops of crystals or other solids or products removed or by its interaction with reagents used, or in other ways. The employment of the usual methods of recovering iodine from solutions therefore in such cases is highly inefficient, so much so as entirely to preclude the profitable manufacture of that commodity from certain raw materials.

The present invention relates to a process whereby iodine may be efficiently recovered from dilute mixtures or solutions, directly without the concentration of its compounds or at most without concentration to an extent which results in losses of iodine.

Iodine, as is well known, may be liberated in the elemental form in dilute solutions and may then be gotten into the vapor state by heating, by "blowing-out" with steam and in other ways. But under such circumstances, except under especially favorable conditions, it is so diluted by the steam or other gas used in vaporizing it that it can not be successfully recovered by condensation to the crystalline state, entirely precluding its efficient recovery by methods heretofore employed.

However, in the present invention I have found that if those vapors however dilute be brought into intimate contact with some absorbent for the iodine which will remove it immediately from the vapor stage and convert it into a form in which it no longer is in equilibrium with nor contributes to the vapor stage and which absorbent is capable of absorbing the iodine to a high concentration, complete recovery of the iodine may be effected and it may be elevated to a very high concentration in a very small volume of solution.

The present invention relates to a process whereby the iodine in such dilute vapor stage may be recovered approximately quantitatively and therefore efficiently, and in a convenient and economical manner, as hereinafter disclosed.

The invention may be illustrated by the following detailed description of a specific embodiment thereof. A solution containing iodine in a known state of oxidation or reduction is treated with an oxidizing or reducing agent, as the case may be to effect the complete liberation of the iodine in the elemental state, or in that state from which it can be made to pass into the vapor state. Steam or other gaseous reagent is then passed through the solution, or the solution is heated to boiling or other means is adopted to obtain the iodine in the vapor state whereupon this vapor of iodine or mixture of iodine and other gas or gases is led into an absorbing tower or series of towers or other absorbing device where it is brought into intimate contact with an absorbent for the iodine. As a gas for conveying the vapor of iodine I prefer to use steam and as an absorbent I prefer to use an aqueous solution of caustic soda or caustic potash, but do not restrict my process to these uses. And I prefer to pass the mixture of vapors into an absorbing tower and upward through the tower countercurrent to the gravity flow of the absorbent downward through the tower, although other methods may be used to effect the intimate intermixture of the vapors and absorbent. Where aqueous solutions of caustic are employed the absorbent may be circulated repeatedly to complete neutralization of the caustic by the iodine. And where a concentrated solution of caustic is employed, its complete neutralization by the iodine represents a very high concentration in that element in a solution of relatively very small volume. Furthermore, since vaporous iodine is absorbed by the said absorbent in accordance with an irreversible reaction equilibria are not established short of complete saturation and therefore quantitative absorption is not only possible but is easily accomplished.

When the aforementioned absorbent has been circulated through the absorbing tower for a long enough period, that is until it has become saturated with, or has absorbed the desired amount of iodine, it is withdrawn and a fresh volume is substituted for it; or other modifications are introduced to effect continuous operation.

The iodine is then recovered from the absorbent in any convenient manner. However where aqueous caustic solutions are employed, as is my preferred practice, the iodine is liberated therefrom by acidification. The reaction involved in the absorption of iodine by caustic may be represented by the equation:—

$$6NaOH + 3I_2 = 5NaI + NaIO_3 + 3H_2O$$

The reaction whereby the iodine is liberated from the absorbent, where caustic has been used as the said absorbent may be represented by the equations:—

$$5NaI + NaIO_3 + 3H_2SO_4 = 5HI + HIO_3 + 3Na_2SO_4$$
$$5HI + HIO_3 = 6I + 3H_2O$$

From the foregoing equations it is seen that when the iodine is absorbed by the caustic it enters into reactions with the caustic whereby the two compounds of iodine, an iodide and an iodate, are formed, and are formed in such proportions relative to each other that when for example the solution in which they are formed and still exist in this proportion is acidified, the two interact with each other in such a way as to liberate all of the iodine present therein in both compounds and to yield the same in the form of elemental iodine. The iodine thus liberated from a highly concentrated solution forms a sludge or heavy precipitate of amorphous or finely crystalline iodine, which is filtered or otherwise removed from the solution from which precipitated.

The product thus yielded is in a sufficiently high state of purity for use in many of the ways in which that element is employed in the arts and industries, or it may be further refined or resublimed by any acceptable method.

The principal advantages which I claim for my new process as contrasted with other methods of obtaining iodine from solutions or other mixtures are:

(a) It provides for the simple, efficient and direct recovery of iodine by volatilization methods from very dilute solutions or mixtures, that is to say from solutions or mixtures of such dilution that other known methods of recovery are not commercially feasible; and (b) It provides for the simple, efficient and direct absorption of vaporous iodine from very dilute solutions or mixtures of iodine vapor in other gases, that is to say from solutions or mixtures of such dilution that other known methods of recovery are not commercially feasible.

I claim:

1. The process of concentrating iodine on a commercial scale which comprises passing iodine in the vapor state countercurrentwise against a stream of liquid absorbent.

2. The process of concentrating iodine on the commercial scale which comprises conveying the vapor of iodine with a stream of gas countercurrent-wise against a stream of absorbent.

3. The process of obtaining iodine on a commercial scale which comprises the liberation of iodine from its compounds, its delivery into the vapor state, its conveyance by a current of gas into countercurrent contact with a solution of caustic alkali to form by absorption therein a concentrated solution of iodine-iodate, and the acidification of said solution to precipitate iodine in the solid state.

4. The process of producing elemental iodine on a commercial scale, which comprises volatilizing iodine from its mixtures, passing the iodine vapors produced countercurrentwise against a stream of liquid absorbent, and acidifying the resulting solution.

5. The process of producing elemental iodine on a commercial scale, which comprises volatilizing iodine from its mixtures, passing the iodine vapors thus produced countercurrentwise against a solution of caustic alkali and liberating the iodine in the elemental state.

6. The process of producing elemental iodine on a commercial scale, which comprises volatilizing iodine from its compounds, passing the iodine vapors thereby produced countercurrentwise against a stream of liquid absorbent, and subsequently liberating the iodine in the elemental state.

7. The process of producing elemental iodine on a commercial scale, which comprises volatilizing iodine from its mixtures, passing the iodine vapors countercurrentwise against a solution of sodium hydroxide, and subsequently liberating the iodine in the elemental state.

8. The process of concentrating iodine on a commercial scale, which comprises passing iodine in the vapor state countercurrentwise against a solution of caustic, whereby iodine and iodate are formed in such proportions that upon subsequent acidification all iodine is liberated.

9. The process of concentrating iodine on a commercial scale, which comprises passing iodine in the vapor state and mixed with steam, countercurrentwise against a stream of absorbent.

JOHN W. TURRENTINE.